Sept. 9, 1924.
T. A. REILLY ET AL
AGRICULTURAL MACHINE
Filed Nov. 21, 1919
1,507,794
3 Sheets-Sheet 1
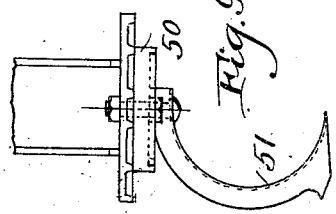
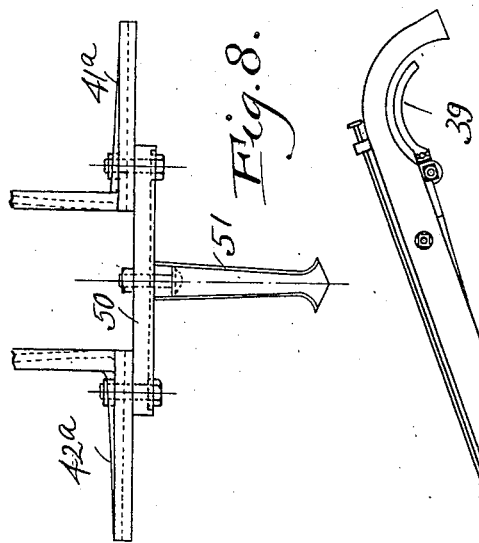
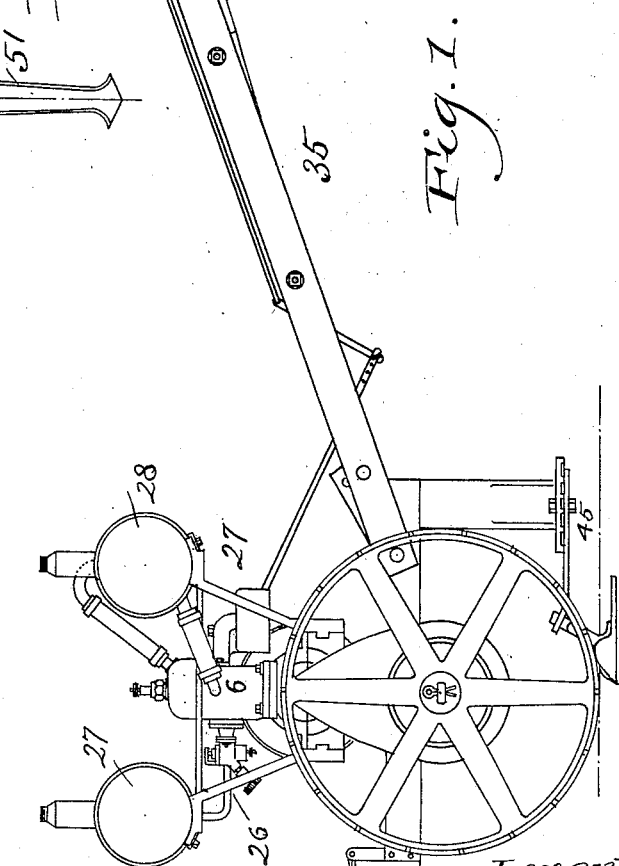
Inventor
Thomas A. Reilly
and
Ralph Ditty
By Thurston Know & Hudson
attys.

Sept. 9, 1924.
T. A. REILLY ET AL
1,507,794
AGRICULTURAL MACHINE
Filed Nov. 21, 1919  3 Sheets-Sheet 2
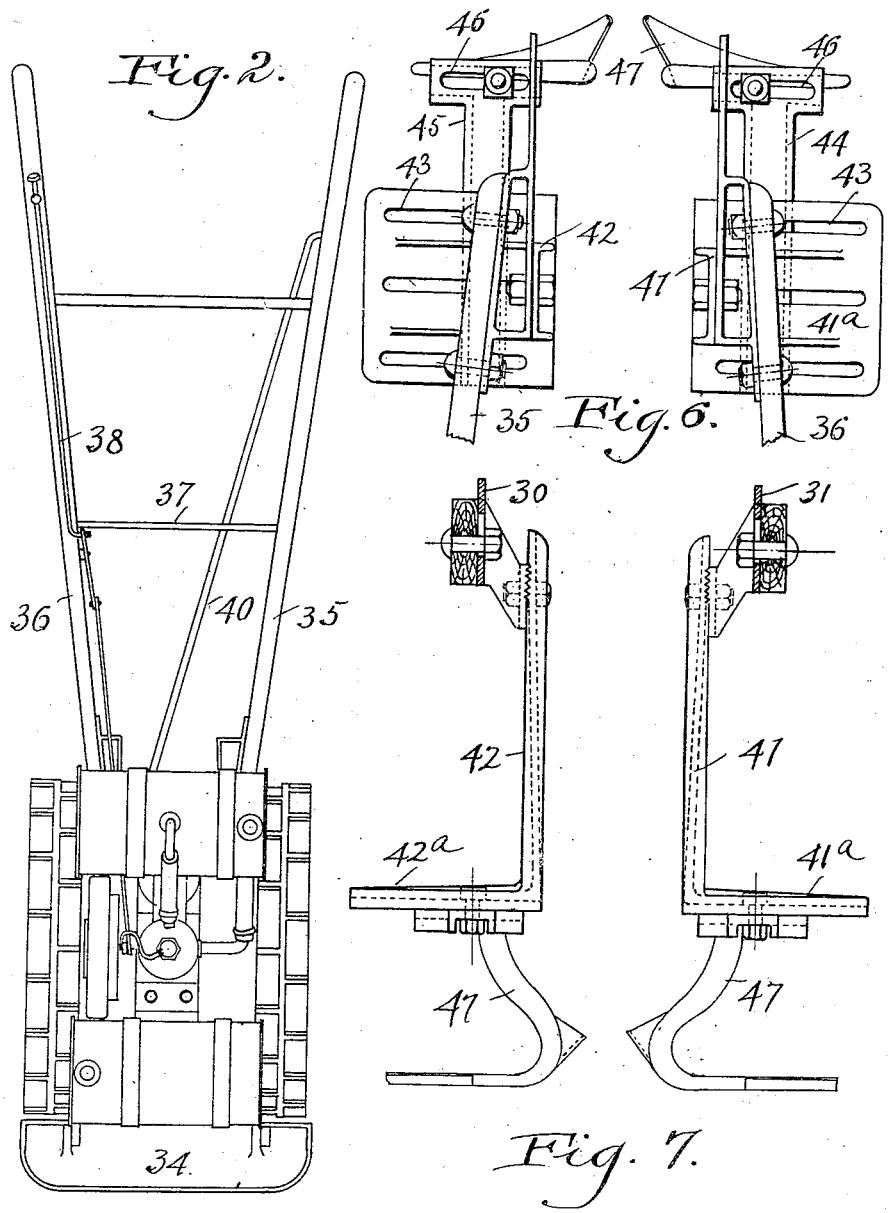

Sept. 9, 1924.

T. A. REILLY ET AL

AGRICULTURAL MACHINE

Filed Nov. 21, 1919  3 Sheets-Sheet 3

1,507,794

Inventors
Thomas A Reilly
and
Ralph Ditty
By Thurston Rose & Hudson
atty's

Patented Sept. 9, 1924.

1,507,794

UNITED STATES PATENT OFFICE.

THOMAS A. REILLY AND RALPH DITTY, OF CLEVELAND, OHIO, ASSIGNORS, BY MESNE ASSIGNMENTS, TO THE FEDERAL FOUNDRY SUPPLY COMPANY, A CORPORATION OF OHIO.

AGRICULTURAL MACHINE.

Application filed November 21, 1919. Serial No. 339,607.

*To all whom it may concern:*

Be it known that we, THOMAS A. REILLY and RALPH DITTY, citizens of the United States, and residents, respectively, of Cleveland, in the county of Cuyahoga and State of Ohio, and Cleveland, in the county of Cuyahoga and State of Ohio, have invented a certain new and useful Improvement in Agricultural Machines, of which the following is a full, clear, and exact description.

The present invention relates to a hand steered power driven agricultural machine having the ground wheels of narrow gauge and a frame so arranged that ground engaging tools of different character may be utilized in connection with the machine, such as cultivating tools, plow or a hoe.

The object of the invention is to provide a machine of the character described in which the arrangement of parts is such as to readily enable the cultivation of the soil close up to the rows of growing vegetables, thereby enabling efficient cultivation of the soil.

A further object of the invention is to provide a robust construction which may be easily assembled, the construction being such as to require a minimum amount of machining in order to produce finished product.

A further object of the invention is a production of a machine in which the frame supporting the operative parts of the device is formed substantially as a single casting so that the bearing for the various parts of the machine may be accurately aligned and will not get out of alignment in the operation of the machine.

Other objects of the invention will appear as the description proceeds and generally speaking the invention may be said to comprise the elements and the combinations thereof set forth in the accompanying claims.

Figures 4, 5:
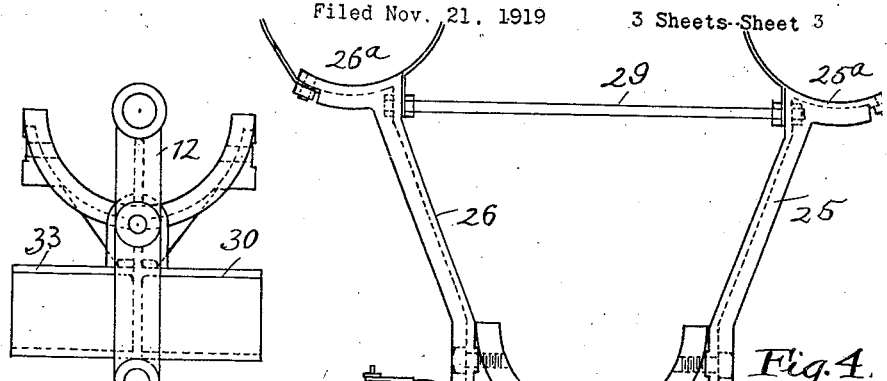
Figure 3:
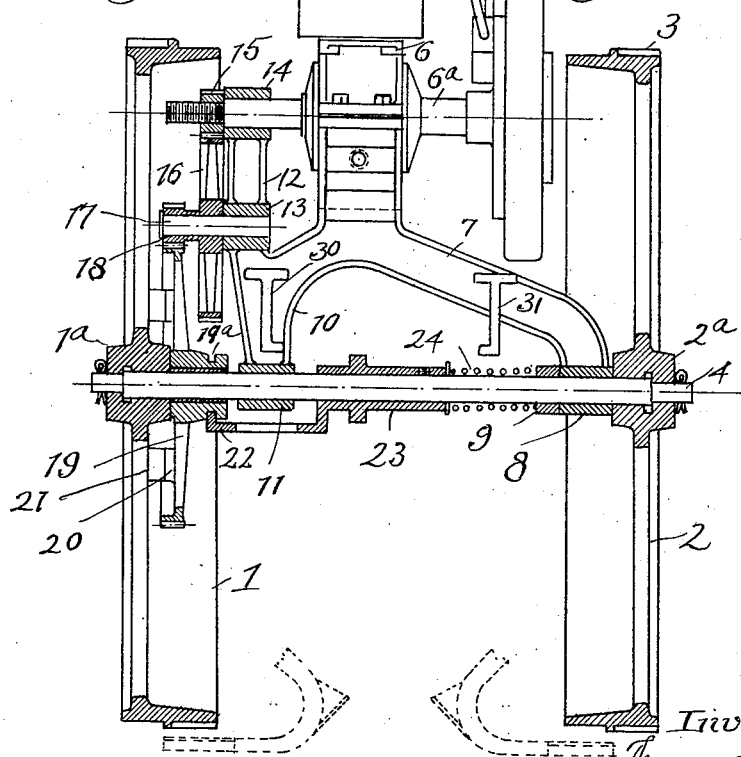

Reference should be had to the accompanying drawings forming a part of the specification in which Fig. 1 is a side elevation; Fig. 2 is a top plan view; Fig. 3 is a central vertical section; Fig. 4 is an end elevation of the frame of the machine; Fig. 5 is an end elevation opposite to that shown in Fig. 4; Fig. 6 is a top plan view of that portion of the machine which carries the tools or ground engaging implements; Fig. 7 is an elevation with portions in section of the showing in Fig. 6; Fig. 8 is an elevation of a portion of the machine showing an arrangement for supporting the ground engaging tools; Fig. 9 is a side elevation of the showing in Fig. 8.

Referring to the drawings wherein similar reference characters indicate like parts No. 1 and 2 represent wheels, which are formed with central hubs, 1ª and 2ª, each of the wheels having radiating spokes which join to an outer broad surfaced rim, such as indicated at 3. The rims of the wheels upon their outer surfaces are formed with projections or cleats in order to gain more effective traction between the wheels and the ground.

The wheels are formed so that the spokes co-operate with the rim adjacent one edge thereof, and the remaining portion of the rims extend toward each other and overhang. This construction enables the use of a broad rim, at the same time does not unduly increase the width of the cultivator because as will be seen from Fig. 3 a portion of the driving mechanism lies within the overhanging portion of the rim.

This is a feature of considerable importance inasmuch as it is customary to plant rows of vegetables or growing plants, in rows, which rows are spaced apart certain distances which are not greater than that necessary in order to promote good growth of the vegetation and the gauge of a cultivator must be such as to accommodate itself to the width customarily and conventionally employed between rows of vegetation.

The wheels 1 and 2 are fixedly mounted upon an axle adjacent the end thereof, and the arrangement is such that the wheels occupy a fixed position upon the axle.

Mounted upon the axle and lying between the wheels is a frame casting which comprises a central saddle portion 5 adapted to receive the propelling motor for the machine which motor is indicated at 6. The motor in the present instance is a gasoline motor, but inasmuch as this forms no part of the invention further description need not be given thereof. The motor 6 is secured in the saddle 5 of the frame in any desired manner as by means of bolts such as indicated in Fig. 3.

The frame before referred to has an extending portion 7 which at its end is formed with a bearing or journal 8. Through this bearing 8 extends the axle 4. This bearing is positioned adjacent the hub 2ª of the wheel 2 and is held in place by a retaining member 9.

The frame also has an extending member 10, which extends generally opposite to the member 7; this portion 10 is formed with a bearing or journal 11 through which the axle 4 extends.

Neither the bearing 8 or the bearing 11 are in any way secured to the axle, but merely mounted thereon.

The extension 10 has an upwardly extending part 12, in which are formed the bearings 13 and 14. The bearing 14 is so positioned as to receive the motor shaft 6ª and to form a journal and support for one end of the motor shaft.

The shaft 6ª carries a pinion 15 which meshes with a gear 16, this gear is carried upon a short shaft 16 supported in the bearing 13.

Upon the same shaft 17 is a pinion 18, which meshes with a gear 19, which is loosely mounted upon the axle 4.

The gear 19 upon the portion thereof which is adjacent the wheel 1 is formed with extending teeth 20 and upon the wheel 1 there are also formed teeth 21. These teeth 20 and 21 are oppositely disposed and are adapted to engage with each other when the gear 19 is shifted for the purpose, thereby forming a clutch and a driving relationship between the gear 19 and the ground wheel 1.

The hub of the gear 19 is provided with a slot 19ª which is engaged by a member 22. This member has a portion 23 which is mounted as a sleeve upon the axle 4. Between the end of the sleeve 23 and the member 9 there is a spring 24 which normally urges the sleeve 23 and the gear 19 toward the ground wheel 1 to effect a driving relationship between the gear 19 and the ground wheel.

As will be later described an operating lever is provided by which the sleeve 23 may be operated to effect at will the clutching or unclutching of the gear 19.

It is believed from the description which precedes that the driving relationship between the motor and the ground wheels will be clearly understood and obviously the gear ratio may be altered without changing the invention.

The feature of construction of having the clutched teeth carried by the gear 19 and co-operating with the clutch teeth carried by the ground wheel is a feature of some importance inasmuch as it saves considerable space over a construction which employs a clutch as an additional element.

Extending upwardly from the saddle 5 of the frame are arms or brackets 25 and 26, these arms are preferably bolted to the frame as indicated in Fig. 4. The arms as will be seen from Fig. 1 lie upon opposite sides of the motor. The arms at their upper extremity have seats 26ª and 25ª which are adapted to receive tanks indicated at 27 and 28, these tanks are held in position by means of straps. The ends of the straps being secured to the portions 25ª and 26ª of the arms. Extending transversely between the arms 25 and 26 is a tierod or tiestrap.

The tanks 27 and 28 serve as fuel tank and cooling water tank respectively. These tanks as will be noted from Fig. 1 are symmetrically positioned upon opposite sides of the motor 6 and hence in the normal position of the machine as shown in Fig. 1 substantially balance each other.

Secured to or formed integrally with the extensions 7 and 10 are extending members 30 and 31 which extend upon one side of the frame and other extending members 32 and 33 which extend upon the other side of the frame. Secured to the extension 32 and 33 is a box or receptacle 34 which is adapted as a tool box.

To the extensions 30 and 31 there are respectively secured handles 35 and 36, these handles are of usual form and are suitably spaced and braced by means of rods such as indicated at Fig. 37. As will be understood these handles are adapted to be grasped by the user for the purpose of steeering the machine during its operation.

One of the handles such as the handle 36 has mounted thereon suitable lever mechanism such as indicated at 38 which is connected with the timing apparatus for the motor and this lever mechanism is in convenient position on the handle to be manipulated by the operator.

One of the handles such as the handle 35 has a lever 39 pivoted thereon which is by means of a rod 40 operatively connected with the sleeve 23 upon the axle. Operation of the lever 39 is conveniently arranged for operation.

Mounted upon the extensions 30 and 31 are implement supports 41 and 42, these being secured in any desired manner as by means of bolts and in order to secure tight and not readily movable connections the engaging surfaces are provided with teeth which engage and thereby prevent relative movement.

The implement supports 40 and 41 have at their lower end extensions 41ª and 42ª, these extensions are provided with slots such as indicated at 43 and are adapted to receive and support implement carriers 44 and 45, these carriers are bolted to the parts 41ª and 42ª of the implement supports by bolts which extend through the slot 43, the arrangement permitting a wide degree of adjustability. The implement carriers at their outer ends are provided with slots such as indicated at 46, which slots are adapted to receive bolts by which the implements, such as indicated at 47 are secured.

From the arrangement which has been described it will be noted that the implements 47 which in the present instances are cultivating tools may be given a considerable latitude in adjustment and as will be seen in Fig. 1 the implement carriers extend toward the wheel and as indicated at Fig. 3 the ground engaging implements lie between the wheels and engage the ground at but a small distance behind the point of engagement between the ground wheels and the ground.

This arrangement is of importance in that the ground engaging implements have but a small radius of movement with respect to the wheels during the steering of the machine. In other words the tools are placed so near to the wheels, that in steering, the tools practically follow the movement of the wheels and no allowance need be made for the tools as is necessary when the tools are positioned at a considerable distance behind the wheels.

Where it is desired to use a plow instead of cultivating tools, a plate 50 is bolted to the parts 41ª and 42ª of the tool supports and the plow as indicated at 51 is bolted to the plate 50.

Having described our invention, we claim—

1. In a device of the character described, the combination with a frame having a motor receiving portion, oppositely disposed bearings beneath the motor receiving portion forming a part of the frame, an axle which extends through said bearings and ground wheels secured to said axle outside the bearings, an arm extending upwardly from the frame and provided with bearing portions, the axis of said arm lying in the same plane as the axis of the motor receiving portion, said bearing portions of the arm serving to support members driven from the motor.

2. In a device of the character described, the combination of a frame having a motor receiving portion bearing members forming a part of said frame an axle extending through said bearings, ground wheels secured to the axle outside the bearings, said frame having other bearing portions, the centers of which are in the same plane with a vertical axis of the motor receiving portion, gear shafts supported in last mentioned bearings and gears supported by the said shafts.

3. In a device of the character described, the combination of a frame having a central portion formed as a saddle and adapted to receive a motor, an arm extending from said frame and having a bearing portion, another arm extending from the frame and having a bearing portion, an axle extending through said bearing portions, ground wheels secured to said axle, said frame having an upwardly extending portion formed with bearings, one of said bearings being centered with respect to the motor receiving portion of the frame and adapted to receive the motor shaft, a gear carried by the motor shaft, a short shaft mounted in one of the bearings just mentioned, a gear carried by said shaft and meshing with the gear and the motor shaft, a second gear carried by the said short shaft, a gear carried by the axle and meshing with the last mentioned gear and clutch means for effecting a driving operation.

In testimony whereof, we hereunto affix our signatures.

THOMAS A. REILLY.
RALPH DITTY.